United States Patent [19]

Green

[11] Patent Number: 4,874,191
[45] Date of Patent: Oct. 17, 1989

[54] FLUE GAS CONDUIT CONNECTOR

[75] Inventor: Lloyd C. Green, Greenfield, Mass.

[73] Assignee: Heat-Fab, Inc., Greenfield, Mass.

[21] Appl. No.: 354,878

[22] Filed: May 22, 1989

[51] Int. Cl.$^4$ .............................................. F16L 25/00
[52] U.S. Cl. ................................ 285/332.3; 285/382; 285/420; 285/424
[58] Field of Search .................. 285/332.2, 332.3, 382, 285/424, 253, 257, 420

[56] References Cited

U.S. PATENT DOCUMENTS

| 134,158 | 12/1872 | Nutting | 285/253 X |
| 964,052 | 7/1910 | Pflugh | 285/382 X |
| 4,093,282 | 6/1978 | Kyriakodis | 285/253 X |
| 4,358,139 | 11/1982 | Hoy | 285/332.3 |

FOREIGN PATENT DOCUMENTS 434908 10/1926 Fed. Rep. of Germany ...... 285/382

Primary Examiner—Dave W. Arola
Attorney, Agent, or Firm—Ross, Ross & Flavin

[57] ABSTRACT

A flue gas conduit connector for joining together the ends of flue gas conduits by means of locking tabs on the outer surface of one flue gas conduit which may be bent over a locking ring or the other flue gas conduit, the ends of the flue gas conduits being provided with complemental taper joints and a sealing gasket to provide a leak-proof corrosion resistant inner flue passage uncorrupted by low alloy fasteners.

1 Claim, 2 Drawing Sheets

FLUE GAS CONDUIT CONNECTOR

BACKGROUND OF THE INVENTION

1. Field of the Invention

The invention relates to connectors for joining together the ends of flue gas conduits such as vent connectors, gas vent, flue pipe, factory built chimneys, or the like used with heating appliances burning gas, liquid, or solid fuels for venting smoke and flue gases to the atmosphere.

2. Description of Related Art

A wide variety of such connectors are known. However, most are complicated in their structure, unreliable in their use in failing to provide a leak-proof connection between the conduits and fail to provide a corrosion resistant inner flue passage which is uncorrupted by low alloy fasteners.

SUMMARY OF THE INVENTION

A primary object of the invention is to provide a flue gas conduit connector which creates a corrosion resistant inner flue passage uncorrupted by low alloy fasteners of any kind, and a system which will contain low pressure venting of mildly corrosive exhaust gases through the use of a taper fit secured by locking tabs and a sliding ring, with all components of the joint configuration being external to the inner flue of the system allowing inspection at all times.

Herein, locking tabs are welded to the outside of the belled end of a flue gas conduit so that spot welds are outside of the flue path.

Each flue gas conduit end joint is designed so that as the locking tabs are bent over the sliding ring the ring is pulled onto an expanded bead drawing the taper joint together tightly and securely into a bead of silicone based gasket material, while preventing the ring from slipping over the joint.

DESCRIPTION OF THE PREFERRED EMBODIMENT

Figure 1:
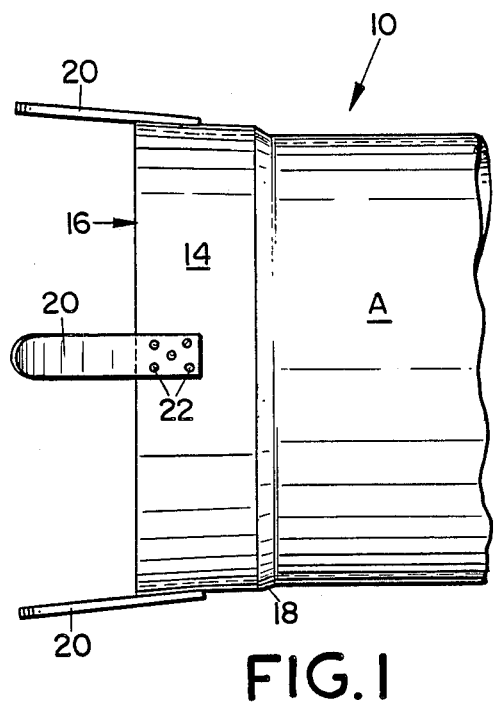
FIG. 1 is a front elevational view of a first component of the flue gas conduit connector of the invention.
Figure 2:
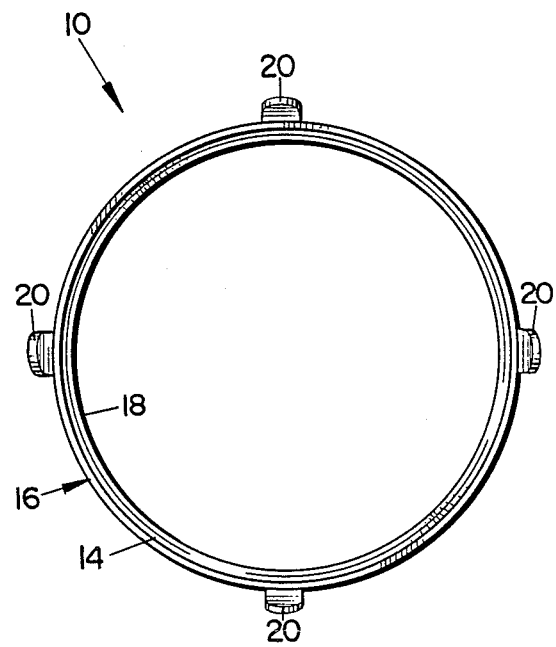
FIG. 2 is an end elevational view as seen from the left of FIG. 1.
Figure 3:
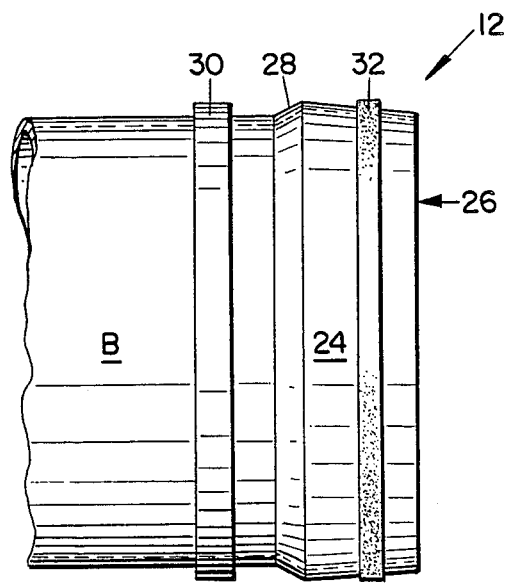
FIG. 3 is a front elevational view of a second component of the flue gas conduit connector of the invention.
Figure 4:
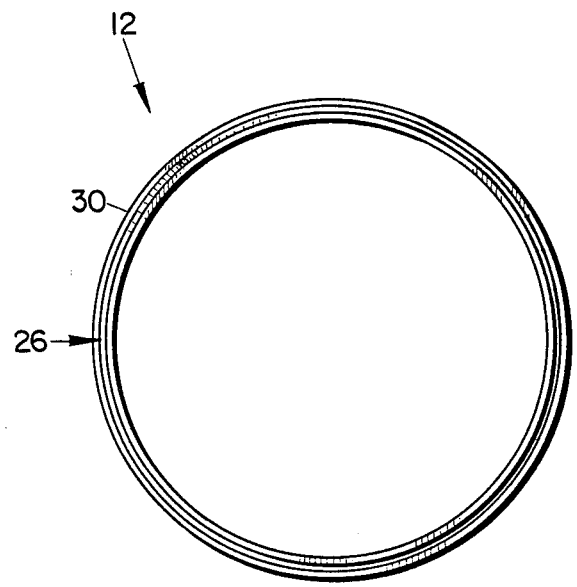
FIG. 4 is an end elevational view as seen from the left of FIG. 3.

The flue gas conduit connector of the invention includes a first or female component 10 formed as an integral portion of the end of a first metallic flue gas conduit A, as shown in FIGS. 1 and 2, and a second or male component 12 formed as an integral portion of the end of a second flue gas conduit B, as shown in FIGS. 3 and 4.

Figure 5:
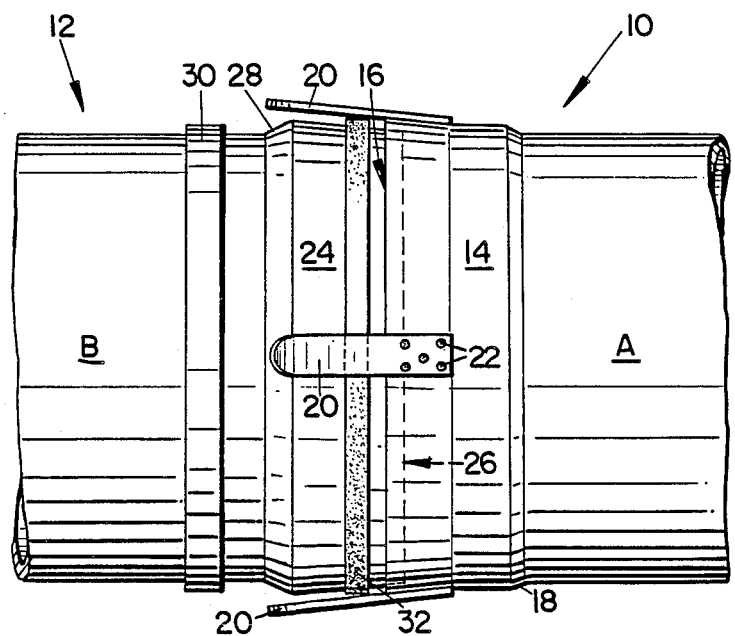
FIG. 5 is a front elevational view showing the first and second components in mated position preparatory to being clamped together.
Figure 6:
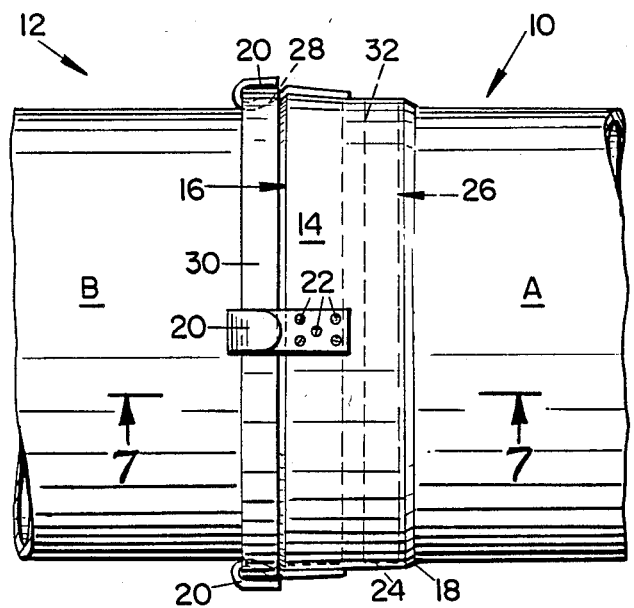
FIG. 6 is a front elevational view showing the first and second components in clamped position.
Figure 7:
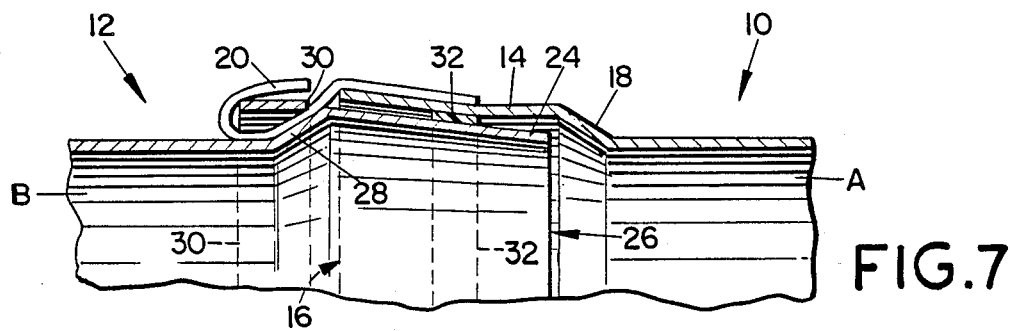
FIG. 7 is an enlarged, fragmentary crioss-sectional view taken on line 7—7 of FIG. 6.

The first and second components 10 and 12 are adapted to be brought into mating telescopic relationship and clamped together as shown in FIGS. 5-7.

First component 10 includes a bell-shaped, tapered, annular end joint 14 which tapers inwardly from an end portion outer face 16 and terminates at an inner shoulder 18 which merges with first flue gas conduit A.

A plurality of flat, finger-like locking tabs 20 extend substantially-horizontally outwardly from outer face 16 at spaced intervals around bell-shaped end joint 14.

The inner end of each tab 20 is fixed as by spot welds 22 to the outer periphery of bell-shaped end joint 14, thereby avoiding any low alloy fasteners on the interior of the joint and providing a corrosion resistant inner flue passage.

Second component 12 includes a reverse bell-shaped annular, tapered end joint 24 which tapers outwardly from an end portion outer face 26 and terminates at an inner shoulder 28 which merges with second flue gas conduit B.

A locking ring 30 is loosely sleeved on second flue gas conduit B rearwardly of shoulder 28.

A resilient gasket 32 formed from silicone rubber or the like, is positioned on the outer periphery of bell-shaped end joint 24 intermediate outer face 26 and shoulder 28.

Reverse bell-shaped end joint 24 of second component 12 is of appropriate size and configuration as to be snugly receivable in bell-shaped end joint 14 of first component 10 when the two components are brought into confronting, face-to-face position, as shown in FIG. 5.

Further inward movement of second component 12 relative to first component 10 will wedge gasket 32 on the outer face of reverse bell-shaped end joint 24 against the inner face of bell-shaped end joint 14, to create an air-tight seal between the components.

At this time, the first and second components may be securely clamped together by deflecting the outer ends of locking tabs 20 downwardly relative to shoulder 28 of second component 12, sliding locking ring 30 over the tab ends, and then bending the tab ends over the locking ring as shown in FIGS. 6 and 7.

The design is such that as tabs 20 are bent over sliding ring 30, the ring is pulled onto shoulder 28, drawing the bell-shaped joints 14 and 24 together tightly into the resilient gasket 32.

It will be apparent that the flue gas conduit connector hereof creates a corrosion resistant inner flue passage uncorrupted by low alloy fasteners of any kind, in a system which will contain low pressure venting of mildly corrosive exhaust gases through the use of a taper fit secured by the locking tabs and a sliding ring.

Herein, all components of the joint configuration are external to the inner flue of the system allowing inspection at all times. The locking tabs are welded to the outside of the belled end so that the spot welds are outside of the flue path.

The end joint is designed so that as the locking tabs are bent over the sliding ring the ring is pulled onto the expanded bead drawing the taper joints together tightly and securely into the bead of silicone based gasket material, while preventing the ring from slipping to the next section.

I claim:

1. A flue gas conduit connector for joining together the ends of first and second flue gas conduits comprising:

a first annular female tapered end joint on the end of the first flue gas conduit, a second complemental annular male tapered end joint on the end of the second flue gas conduit, and abutment means provided intermediate said second and end and said second tapered end joint, a resilient sealing gasket on the outer periphery of the second male tapered end joint, a plurality of locking tabs secured to the outer periphery of the first female tapered end joint and having free ends extending substantially-horizontally outwardly therefrom at spaced intervals therearound, a locking ring loosely sleeved on the first flue gas conduit adjacent the second male tapered end joint, the second tapered end joint being of appropriate size and configuration as to mate snugly with the first tapered end joint when the ends of the first and second flue gas conduits are brought into face-to-face confrontation, with the free ends of the locking tabs passing over said abutment means and below the locking ring, whereby when the free ends of the locking tabs are bent back upon themselves over the locking ring, said locking tabs engage said abutment means and the first and second tapered end joints are pulled together with the sealing gasket providing a leak-proof seal between the tapered end joints and providing a flue passage uncorrupted by low alloy fasteners.

* * * * *